US011256881B2

(12) United States Patent
Todd et al.

(10) Patent No.: US 11,256,881 B2
(45) Date of Patent: Feb. 22, 2022

(54) DATA VALUATION VIA LANGUAGE-NEUTRAL CONTENT ADDRESSING

(71) Applicant: EMC IP Holding Company LLC, Hopkinton, MA (US)

(72) Inventors: Stephen J. Todd, Center Conway, NH (US); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 570 days.

(21) Appl. No.: 16/256,180

(22) Filed: Jan. 24, 2019

(65) Prior Publication Data
US 2020/0242200 A1 Jul. 30, 2020

(51) Int. Cl.
| G06F 40/58 | (2020.01) |
| H04L 9/06 | (2006.01) |
| G06F 16/33 | (2019.01) |
| G06F 16/901 | (2019.01) |
| G06F 16/182 | (2019.01) |

(52) U.S. Cl.
CPC ............ *G06F 40/58* (2020.01); *G06F 16/182* (2019.01); *G06F 16/3347* (2019.01); *G06F 16/9014* (2019.01); *H04L 9/0643* (2013.01); *H04L 2209/38* (2013.01)

(58) Field of Classification Search
CPC .. G06F 40/58; G06F 16/3347; G06F 16/9014; G06F 16/182; H04L 9/0643; H04L 2209/38; H04L 9/3239
See application file for complete search history.

(56) References Cited

U.S. PATENT DOCUMENTS

| 6,622,123 B1 * | 9/2003 | Chanod ................... G06F 40/58 704/277 |
| 7,437,669 B1 * | 10/2008 | Blakely ................... G06F 9/454 715/264 |
| 2002/0002452 A1 * | 1/2002 | Christy ............... G06F 16/8358 704/3 |

(Continued)

OTHER PUBLICATIONS

Sandeep Rathore, "Content Marketing in a Foreign Language: Steps to Ensuring Success," https://www.semrush.com/blog/the-content-marketers-secrets-to-marketing-in-a-foreign-language/, Feb. 22, 2018, 10 pages.

(Continued)

*Primary Examiner* — Matthew Smithers
*Assistant Examiner* — Mirza Israr Javed
(74) *Attorney, Agent, or Firm* — Ryan, Mason & Lewis, LLP

(57) ABSTRACT

Techniques are disclosed for data valuation using language-neutral content addressing techniques in an information processing system. For example, a method comprises the following steps. The method obtains original content in an original language. The method generates a language-neutral representation of the original content. The method then generates an object comprising the language-neutral representation of the original content and at least one valuation algorithm, wherein the at least one valuation algorithm is configured to perform content valuation. The method generates a cryptographic hash value of the object, and stores the object for access using the cryptographic hash value.

20 Claims, 12 Drawing Sheets

(56) References Cited

U.S. PATENT DOCUMENTS

2012/0265744 A1* 10/2012 Berkowitz ......... G06Q 30/0613
707/705
2017/0364701 A1* 12/2017 Struttmann ......... G06F 16/2282

OTHER PUBLICATIONS

Internet World Stats, "Top Internet Languages in the World," www.internetworldstats.com/stats8.htm, Aug. 24, 2018, 5 pages.
Wikipedia, "Vector Space Model," https://en.wikipedia.org/wiki/Vector_space_model, Jan. 17, 2019, 4 pages.
G. Salton et al., "A Vector Space Model for Automatic Indexing," Communication of the ACM, Nov. 1975, pp. 613-620, vol. 18, No. 11.
Stephen Huffman, "Acquaintance: Language-Independent Document Categorization by N-Grams," https://pdfs.semanticscholar.org/2c01/eabe6f78d8d51842c39feab2edb5bbf4efe2.pdf, Oct. 1997, 13 pages.
Juan Benet, "IPFS-Content Addressed, Versioned, P2P File System," arxiv.org/abs/1407.3561, 2014.
Satoshi Nakamoto, "Bitcoin: A Peer-to-Peer Electronic Cash System," http://bitcoin.org/bitcoin.pdf, 2008, 9 pages.

\* cited by examiner

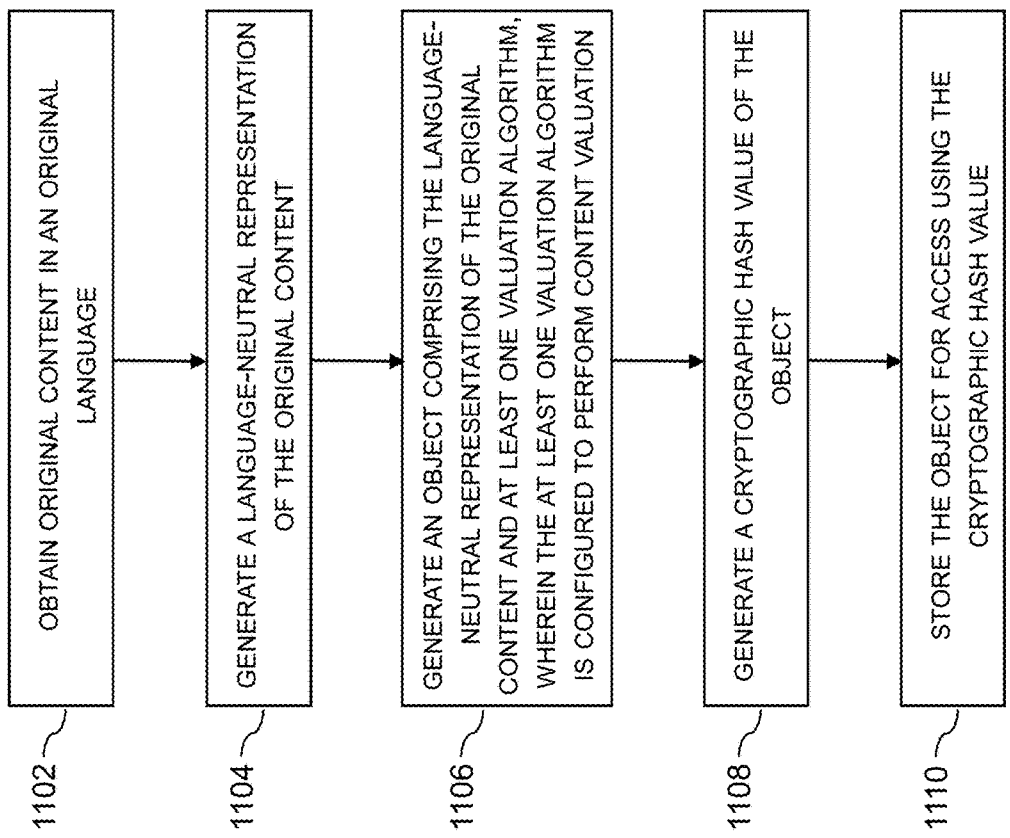

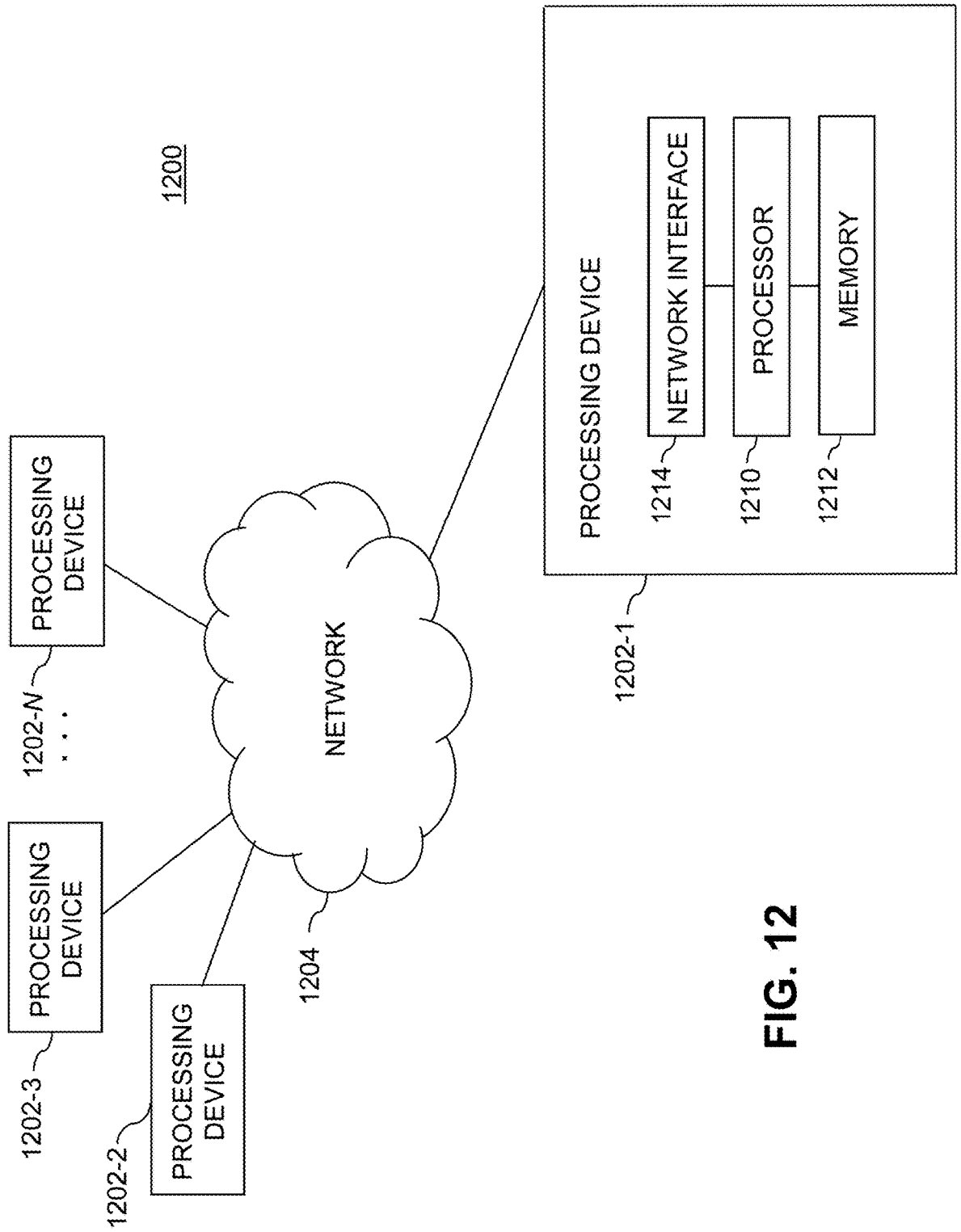

DATA VALUATION VIA LANGUAGE-NEUTRAL CONTENT ADDRESSING

FIELD

The field relates generally to information processing systems, and more particularly to techniques for data valuation using language-neutral content addressing techniques in such information processing systems.

BACKGROUND

Content translation for digital business is becoming increasingly important as the number of non-English websites rapidly increases. This fact has resulted in the realization that in order to reach a larger percentage of the world's population, enterprises have to figure out how to get their valuable data assets translated for maximum business effect. However, translating a document results in a separate file, which can break the correlation with the original document. The creation of multiple versions and storage locations across numerous countries results in the inability to determine how much business impact the original content is having across multiple geographies and cultures. Furthermore, enterprises also miss the opportunity to pick up on large disparities between the value of content in one geography or culture (e.g., China) versus another geography or culture (e.g., France or Germany).

The business value of a piece of content can be measured in any number of ways. As such, calculating data's value across a widely translated document presents significant challenges.

SUMMARY

Embodiments of the invention provide techniques for data valuation using language-neutral content addressing techniques in an information processing system. For example, in one embodiment, a method comprises the following steps. The method obtains original content in an original language. The method generates a language-neutral representation of the original content. The method then generates an object comprising the language-neutral representation of the original content and at least one valuation algorithm, wherein the at least one valuation algorithm is configured to perform content valuation. The method generates a cryptographic hash value of the object, and stores the object for access using the cryptographic hash value.

These and other features and advantages of the invention will become more readily apparent from the accompanying drawings and the following detailed description.

BRIEF DESCRIPTION OF THE DRAWINGS

FIG. 11 illustrates a methodology for data valuation using language-neutral content addressing techniques according to illustrative embodiments.

FIG. 12 illustrates a processing platform used to implement data valuation using language-neutral content addressing techniques according to an illustrative embodiment.

DETAILED DESCRIPTION

Figure 1:
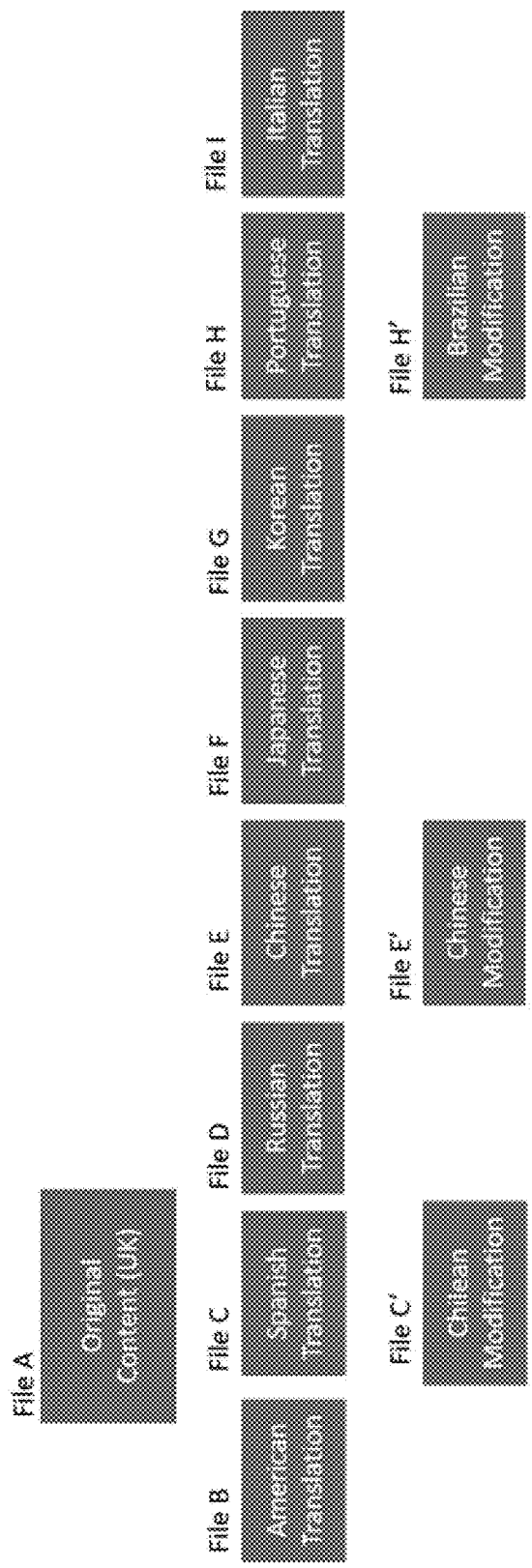
FIG. 1 illustrates an example of a geographic and cultural distribution of content associated with an enterprise.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device of a computing system or some other form of cloud computing platform;

"structured data" as utilized herein is intended to be broadly construed so as to encompass, for example, data that resides in fixed fields within a document, record or file, e.g., data contained in relational databases and spreadsheets; and "unstructured data" as utilized herein is intended to be broadly construed so as to encompass, for example, data that is not considered structured data (in which case, some "semi-structured" data asset may also be considered unstructured data), e.g., documents, free form text, images, etc.; and "metadata" as utilized herein is intended to be broadly construed so as to encompass, for example, data that describes other data, i.e., data about other data.

As mentioned above, calculating data's value across a widely translated document presents challenges. Some of these challenges are described below.

FIG. 1 highlights an example 100 of a piece of original content (File A created in the UK) that undergoes direct translations into eight different languages or language variations including American (File B), Spanish (File C), Russian (File D), Chinese (File E), Japanese (File F), Korean (File G), Portuguese (File H), and Italian (File I). These eight different files are then sent to multiple different regions around the globe based on the translation language. Alternatively, the translation of the original content can be performed in the various regions. In certain regions, it is assumed that the translated content experiences modification to make it more attractive to these regions (e.g., certain concepts may not be understood and/or may be offensive). For example, as shown in FIG. 1, File C is modified to File C' for Chile, File E is modified to File E' for China, and File H is modified to File H' for Brazil.

As each individual piece of content depicted in FIG. 1 is released and executed in different geographies, a business return may (or may not) be experienced. Correlating the value that is experienced back to the original document is difficult for several reasons. These reasons are described below.

Value Variation within One Language.

Figure 2:
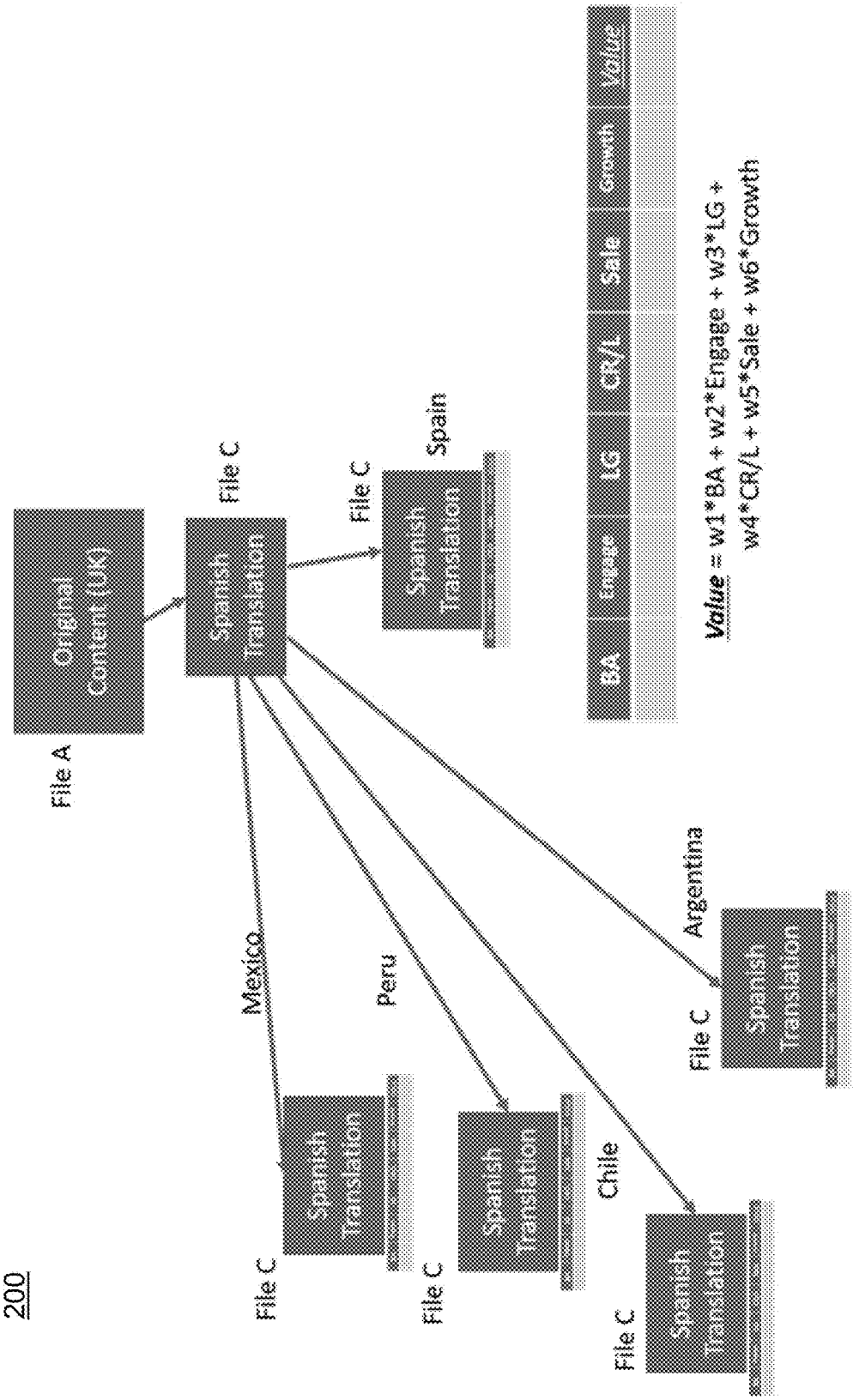
FIG. 2 illustrates an example of identical translations of content experiencing different geographic valuations.

One piece of translated content may be sent to multiple geographies. As illustrated in example 200 of FIG. 2, assume that the original content (File A) is translated into Spanish (File C) and then distributed to multiple Spanish-speaking countries, e.g., Spain, Mexico, Peru, Chile, and Argentina. As the content is executed upon, different values can be calculated on a per-geography basis. In FIG. 2, underneath the image of each translation is a valuation calculation. Each geography can execute the same or a similar valuation algorithm. By way of example only, a plurality of weighted key performance indicators (KPIs) are aggregated to generate a valuation for the translation. As shown in FIG. 2, six weights (w1 through w6) are respectively multiplied against different KPIs including brand awareness (BA), engagement (Engage), lead generation (LG), customer retention/loyalty (CR/L), sales (Sale), and building an audience via subscription growth (Growth). The weighted content measurements are then added to yield a valuation (Value). Since each geographic location (Spain, Mexico, Peru, Chile, and Argentina) can have different results for each KPI (e.g., BA may be assigned a different number in Peru as compared with Chile), the likely result is five different valuations (different Value results) for the same translation. Each valuation is associated with a different copy of the same file, and therefore observing aggregate value and/or examining radical differences in value becomes extremely difficult.

Cross-Region Variable Valuation Weighting.

Figure 3:
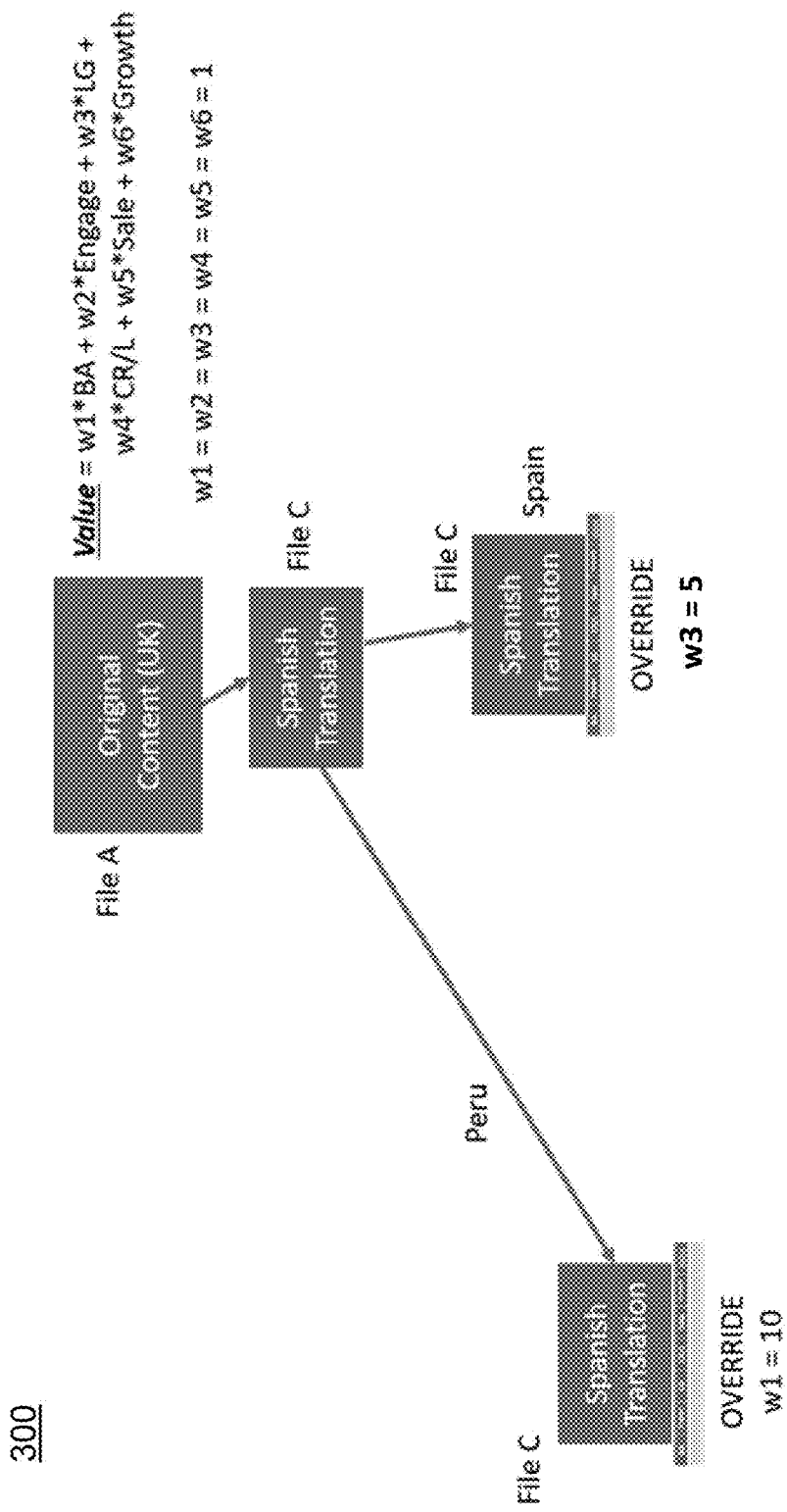
FIG. 3 illustrates an example of cross-geography variation in valuation weighting.

The original creator of a piece of content may specify valuation weightings (e.g., w1 through w6). However, different regions may choose to modify those weightings to achieve different outcomes for the same piece of content. FIG. 3 illustrates an example 300 in which this occurs. Assume that the author of File A (Original Content in the UK) specifies that each of w1 through w6 equals 1. File A is translated into Spanish (File C) and distributed to Peru and Spain. Assume the company associated with the content has zero presence in Peru, and therefore brand awareness (BA) may be ten times more important for the given piece of content. As such, while the author set w1 equal to 1, in Peru w1 is modified to equal 10. In Spain, however, a company may have specific goals to gain share in that region, and therefore lead generation (LG) may be more highly weighted, e.g., five times higher. As such, while the author set w3 equal to 1, in Spain, w3 is modified to equal 5.

Thus, in example 300, both Peru and Spain are using the same equation, but the weightings are different. This causes at least two problems:

1. Comparison of values across geographies is no longer uniform.
2. Recording which regions used which weightings on which piece of content is difficult.

Normalized Value Calculation Across all Translations.

There is no one "value" for a piece of content. Different copies of different translations are spread out across different geographies, and there is no existing automated system for aggregating, normalizing, and comparing values across geographies.

Flagging Underperforming/Overperforming Content.

Given that there is no existing mechanism to aggregate and analyze different content valuation scores, it is also difficult to compare highly variable differences in content value.

For example, if the original content in the UK has a value of 23, but the Chinese translated versions have a value of 2, there is no existing automated mechanism to flag this disparity. Similarly, if the Spanish translation has a value of 50, there is no existing way to flag that the value has more than doubled from the original content.

This inability to compare cross-geography and cross-translation values results in missed opportunities, and an inability to apply lessons learned in one geography to another.

Value Correlation for Altered Content.

The above-described challenges are further exacerbated when modifications are made to the original content. For example, these added problems include:

1. Yet another copy of the file is created.
2. Version control across geographies is difficult.
3. The values calculated for the modified copies often cannot be correlated back to their original versions.
4. Aggregated values for all variants of the original content are difficult to calculate.

Thus, while the drawbacks associated with existing translation systems adversely affect enterprises with respect to business opportunities for their digital content, such drawbacks also present inefficiencies with respect to storage infrastructure and related processing platforms. For example, if content continues to be stored on storage infrastructure in regions where that content is underperforming, then this causes storage and processing burdens on the computing resources that are part of the infrastructure or platform. On the other hand, knowing that certain content performs better (is more highly valued) in other regions, this allows a geographically-distributed processing platform to allocate and deploy more computing resources to that region for that content. It is therefore realized herein that overcoming the existing drawbacks would improve the operations of the storage infrastructure (e.g., storage arrays, etc.) and related processing platforms (e.g., physical servers and virtual infrastructure running on the physical servers).

Illustrative embodiments overcome the above and other challenges via use of format and language independent document representations (language-neutral content modeling) to detect identical (and/or very similar) documents. These documents then undergo content-addressable storage techniques that have the advantage of modeling dozens of language translations as one piece of content. Content-addressable techniques also enable a traceable versioning methodology that assists in correlating versioned values to original content. In some embodiments, distributed ledger-based techniques can record valuation results (as well as weights).

Figure 4:
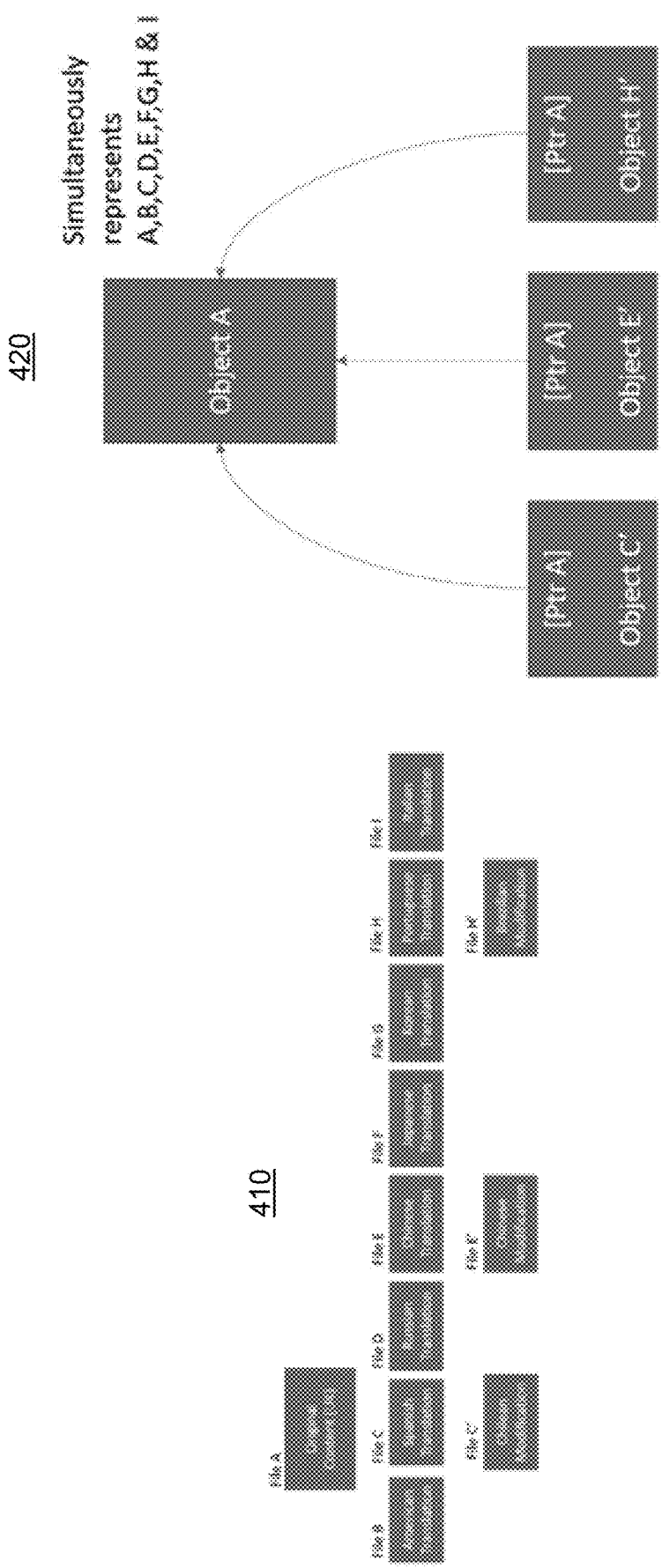
FIG. 4 illustrates language-neutral object storage of content according to an illustrative embodiment.

FIG. 4 illustrates the storage concept of language-neutral content modeling in accordance with illustrative embodiments as compared with the multiple translation approach depicted in FIG. 1. More particularly, recall from FIG. 1 that a piece of original content (File A created in the UK) undergoes direct translations into eight different languages or language variations including American (File B), Spanish (File C), Russian (File D), Chinese (File E), Japanese (File F), Korean (File G), Portuguese (File H), and Italian (File I), and that the content experiences modification in certain regions including Chile (File C'), China (File E'), and Brazil (File H'). This is illustrated again in FIG. 4 in view 410. In contrast as shown in view 420, using language-neutral content modeling according to illustrative embodiments, one file (Object A) is created that simultaneously represents nine of the different files shown in view 410, i.e., Files A, B, C, D, E, F, G, H, and I. Modifications to objects for different regions (e.g., Chilean modification known as File C', Chinese modification known as File E', and Brazilian modification known as File H', as shown in view 410) respectively create new language-neutral documents (Object C', Object E', and Object H') that contain a back pointer to the original content (Object A), as shown in view 420.

Figure 5:
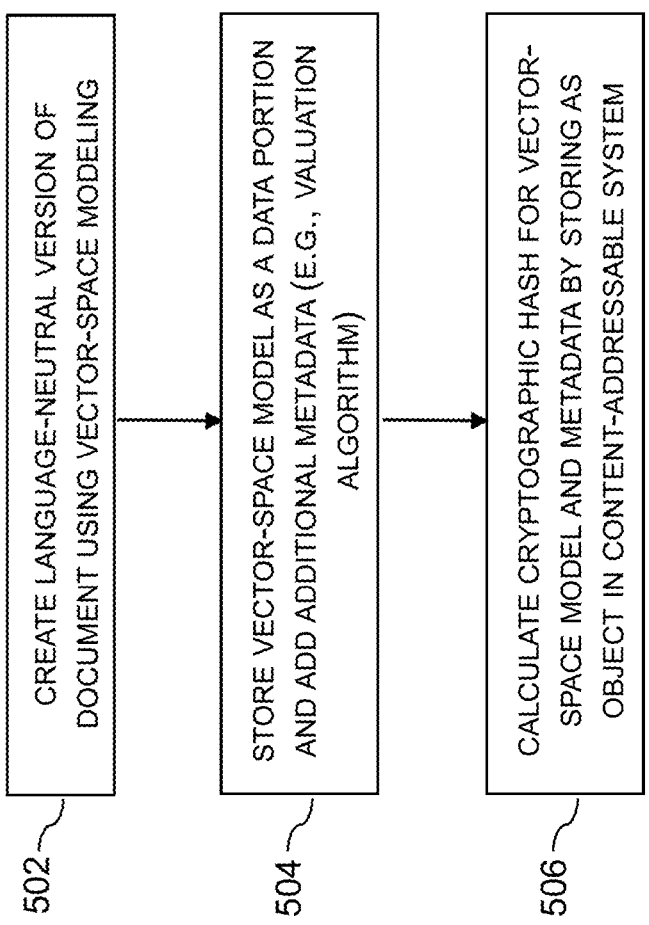
FIG. 5 illustrates a process for creating language-neutral objects according to an illustrative embodiment.

FIG. 5 illustrates a process 500 for creating language-neutral objects (e.g., as shown in FIG. 4) according to an illustrative embodiment.

As shown in step 502, a language-neutral version (representation) of the entire original document is created. In illustrative embodiments, a vector-space model is used to create the language-neutral version. A vector-space model is created to represent the entire document. A vector-space model is an algebraic model for representing text documents as vectors of identifiers. In some embodiments, the identifiers are index terms which are considered the dimensions of the vector. If a term occurs in the document, its value in the vector is non-zero. One illustrative technique that is used for computing the values is term frequency-inverse document frequency (tf-idf) weighting. In tf-idf, a value is computed which reflects how important a word is to a document in a collection of documents (corpus). The tf-idf value increases proportionally to the number of times a word appears in the document and is offset by the number of documents in the corpus that contain the word. It is to be appreciated, however, that other techniques may be employed to compute vector dimensions for the vector representation of the document.

Advantageously, identical and/or very similar documents can be identified by relevance, using the assumptions of document similarities theory, by comparing the deviation of angles between each document vector and a query vector, where the query vector represents a query in the form of a vector with the same dimensions as the vectors that represent the documents.

It is to be appreciated, however, that techniques other than the vector-space modeling technique described herein can be used for creating a language-neutral representation of the original content.

In step 504, the vector-space model is stored as a data portion and additional metadata is added to the data portion. As will be further explained below, the added metadata is a valuation algorithm.

In step 506, a cryptographic hash is calculated for the combination of the vector-space model and the metadata. In some embodiments, the cryptographic hash is generated by storing the vector-space model and the metadata as an object in a content-addressable system.

In illustrative embodiments of a content-addressable system, as will be further explained below, each geographic region where the original content and any translated version is executed has one or more compute nodes (operatively coupled with other geographically remote compute nodes to form the content-addressable system) for generating and/or processing objects and pointers as described herein.

It is realized herein that the author of an original piece of content may have a specific set of business benchmarks that the content is meant to achieve globally. This benchmark value can be represented as a valuation equation with a specific set of weightings. An example of the content, algorithms, and weighting is depicted in FIG. 6.

Figure 6:
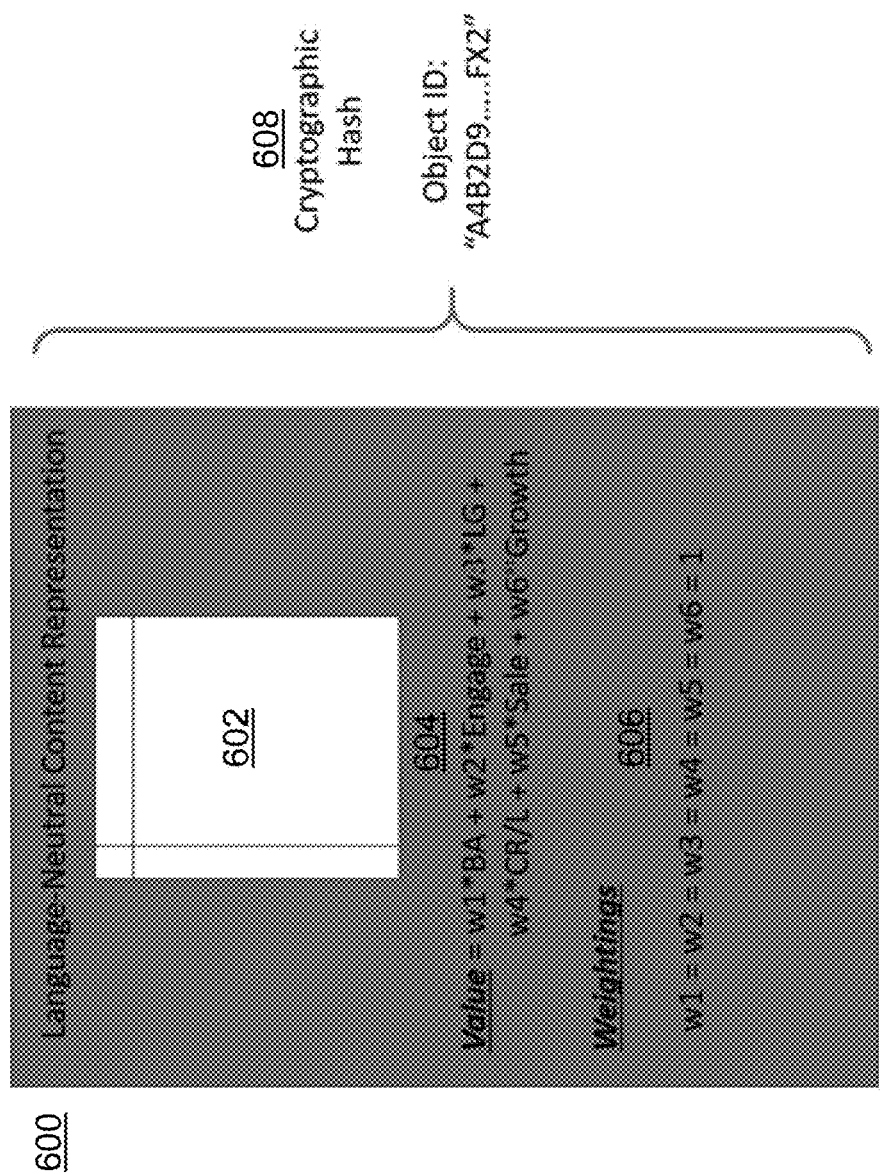
FIG. 6 illustrates embedding one or more valuation algorithms in a language-neutral object according to an illustrative embodiment.

More particularly, FIG. 6 depicts a content-addressable object 600 with a language-neutral content representation 602 stored therein. In one or more illustrative embodiments, the language-neutral content representation 602 is generated as explained above in the context of FIG. 5. A valuation algorithm 604 (multiple valuation algorithms can be part of 604) and weightings 606 are also stored as part of the object 600. Note that one or more of the value algorithms 604 and/or weightings 606 can be stored separately (e.g., within their own content-addressable objects that are referenced via their content address). Also note that while the example in FIG. 6 depicts the business valuation algorithm described above (a summation of weighted KPIs including BA, Engage, LG, CR/L, Sale, Growth), embodiments are not limited to any particular valuation algorithm. For example, the content valuation algorithm can be based on computing resource overhead indicators that measure operational performance of a given set of computing resources that process the content-addressable objects.

In this example, the document along with the valuation algorithm and weightings form an object for which a unique hash ID of "A4B2D9 . . . FX2" is generated. The cryptographic hash ID 608 can be generated using any content-addressing technique. In illustrative embodiments, the object is stored in a globally scalable object store.

One example of an object store is the content-addressable system known as the Interplanetary File System or IPFS. IPFS is an open-source protocol that provides a decentralized method of storing and sharing files relying on a content-addressable, peer-to-peer hypermedia distribution. The compute nodes in an IPFS network form a distributed file system. Thus, in illustrative embodiments, one or more compute nodes of the IPFS are located in the various geographic regions of the translation system. IPFS operates by coupling these nodes with the same system of files. More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system. The IPFS system is further described in J. Benet, "IPFS—Content Addressed, Versioned, P2P File System," 2014, the disclosure of which is incorporated by reference herein in its entirety. However, illustrative embodiments are not limited to this particular content addressable system and alternative systems may be employed. For example, another example of an object store is Dell EMC's Elastic Cloud Storage object system.

Figure 7:
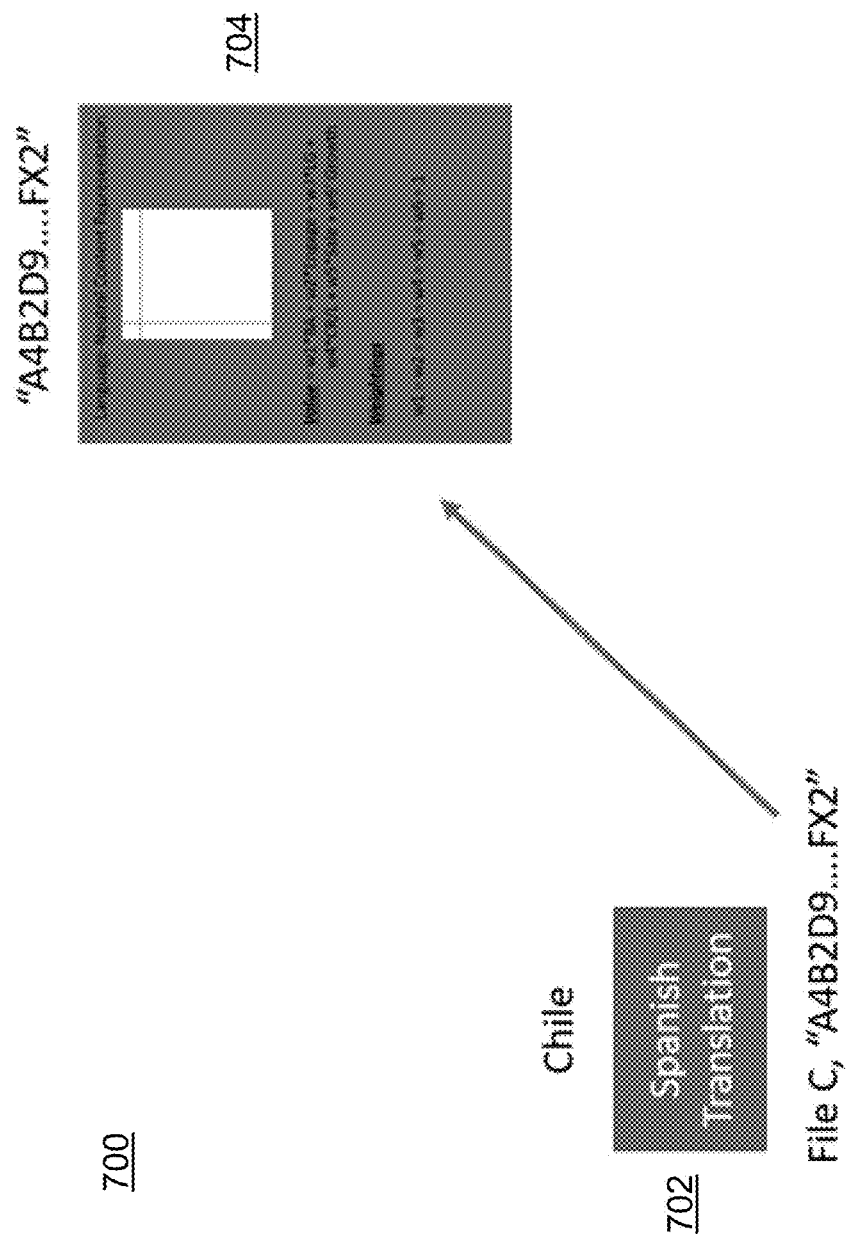
FIG. 7 illustrates a translation locally linked to original content according to an illustrative embodiment.

Using the techniques above, a language translation is created by converting the language-neutral content 602 (e.g., original content in the UK) of the object 600 into a specific language (e.g., Spanish). A copy of the Spanish translation can be stored in any geography, and then locally associated with the hash of the original content. FIG. 7 depicts an example 700 wherein a local version 702 of a Spanish translation in Chile references the object ID (A4B2D9 . . . FX2) of the object 704 (original content in the UK). It is to be understood that, in illustrative embodiments, a compute node of a content-addressable system (e.g., IPFS) is configured to access the Spanish translation of the language-neutral original content and generate the pointer or other link back to the original content object.

Figure 8:
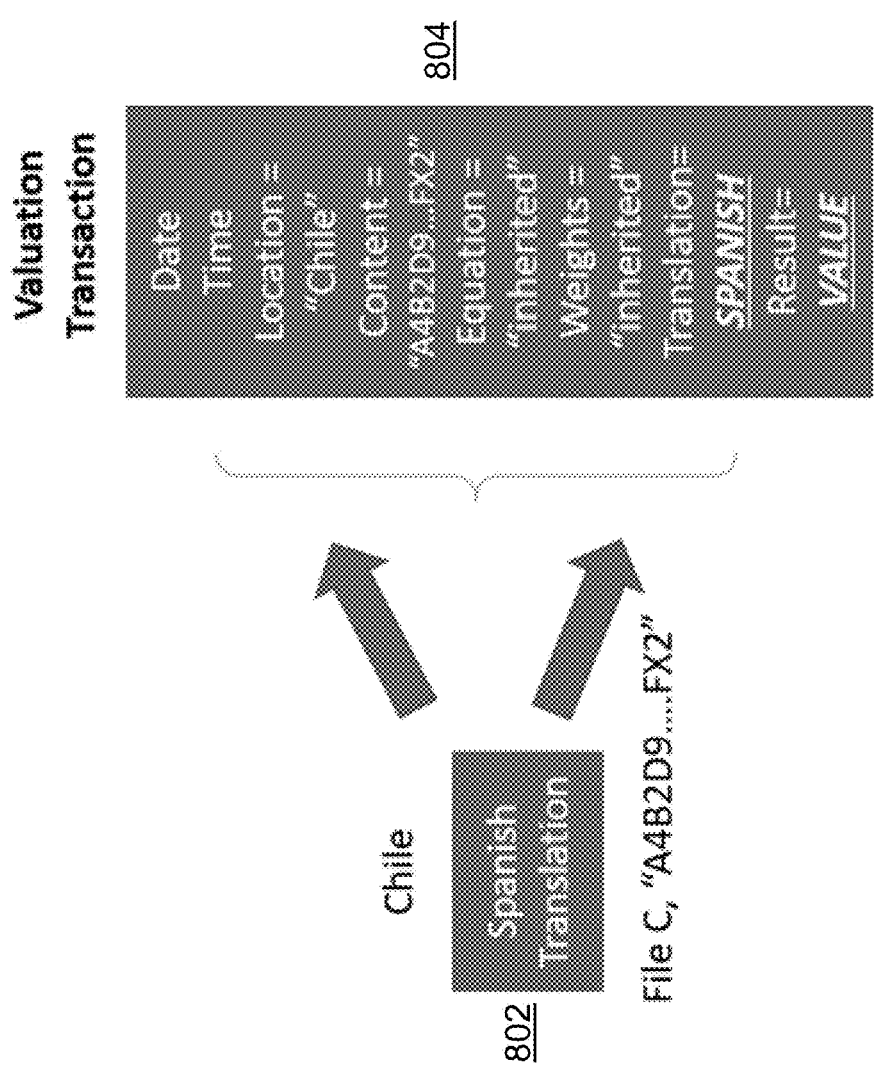
FIG. 8 illustrates a local valuation transaction for language-neutral content according to an illustrative embodiment.

When a piece of content is translated and applied in a specific geography, eventually the value of that data will become evident in that geography via the execution of the valuation equation. In illustrative embodiments, a transaction is created which records the value of the content on a specific date and time in a given region. FIG. 8 depicts an example 800 of a compute node in a specific region creating such a transaction. For example, from a Spanish translation 802 in Chile, a valuation transaction 804 is generated as shown.

In some embodiments, transactions created as illustrated above in the context of FIG. 8 are entered into a globally shared distributed ledger (such as a blockchain).

As used herein, the terms "blockchain," "ledger" and "distributed ledger" may be used interchangeably. As is known, the blockchain or distributed ledger protocol is implemented via a distributed, decentralized computer network of compute nodes. A given one of the blockchain compute nodes resides on a client or the client otherwise has access to a blockchain compute node. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all nodes within the network, inspected, a consensus is reached, and the entry is formally committed to the blockchain based on whether consensus is reached that the entry is validated.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 9:
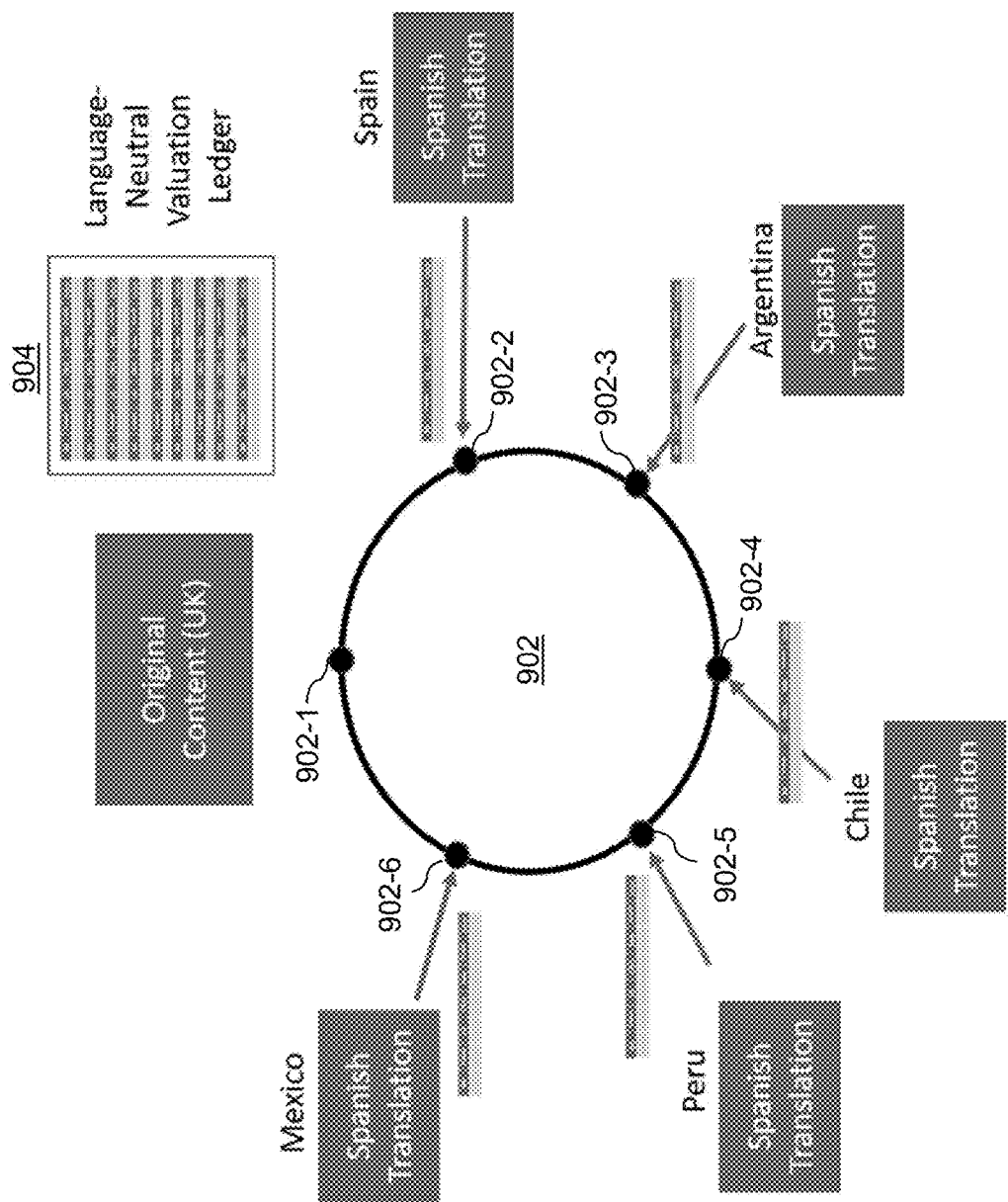
FIG. 9 illustrates a language-neutral valuation system according to an illustrative embodiment.

FIG. 9 illustrates a language-neutral valuation system 902 with a plurality of compute nodes 902-1 through 902-6. Each compute node is associated with a respective geographic location associated with the original content or a particular translation, e.g., 902-1 (Original UK content), 902-2 (Spanish translation in Spain), 902-3 (Spanish translation in Argentina), 902-4 (Spanish translation in Chile), 902-5 (Spanish translation in Peru), and 902-6 (Spanish translation in Mexico).

Note that in various embodiments, each compute node 902-1 through 902-6 is an IPFS node (part of a content-addressable system used to store content objects), a blockchain node (part of a distributed ledger system used to store transactions associated with content objects), or both. In alternative embodiments, each region can have one or more compute nodes that are themselves configured to generate and/or translate content and that are operatively coupled to corresponding regional IPFS nodes and regional blockchain nodes, i.e., the compute nodes that generate and/or translate content do not necessarily have to be nodes in the IPFS or blockchain networks.

Consider an example where system 900 depicts a distributed ledger system and multiple geographic locations are creating valuation transactions and entering them into the distributed ledger system via their corresponding nodes. This allows, for example, the originator of the content (e.g., in the UK) to peruse all entries in the ledger and create a united, global view 904 of how that content is being valued around the world. Every node has access to insert valuation transactions in the ledger, and all nodes also have copies of the entire ledger. This allows all users of content to inspect how different regions in different languages are getting business value out of their content. Thus, as illustrated in FIG. 9, the UK content author can see a global view of all locations with Spanish translations.

It also shows that Argentina, for example, can see whether or not Peru is getting more business value out of their translation and can investigate whether or not their version of the content is underperforming.

Regions that choose to measure value using different weights (or algorithms) also record those weights in their valuation transactions and this allows ledger readers to know that the valuation scores may not be comparable. With such knowledge, in some embodiments, a given location applies a normalization to a valuation score.

A country may find that the translation that they are receiving is not appropriate or impactful for their region, and they may choose to alter the original content or they may choose to use different weights. This causes the creation of a new object with a different content address.

Figure 10:
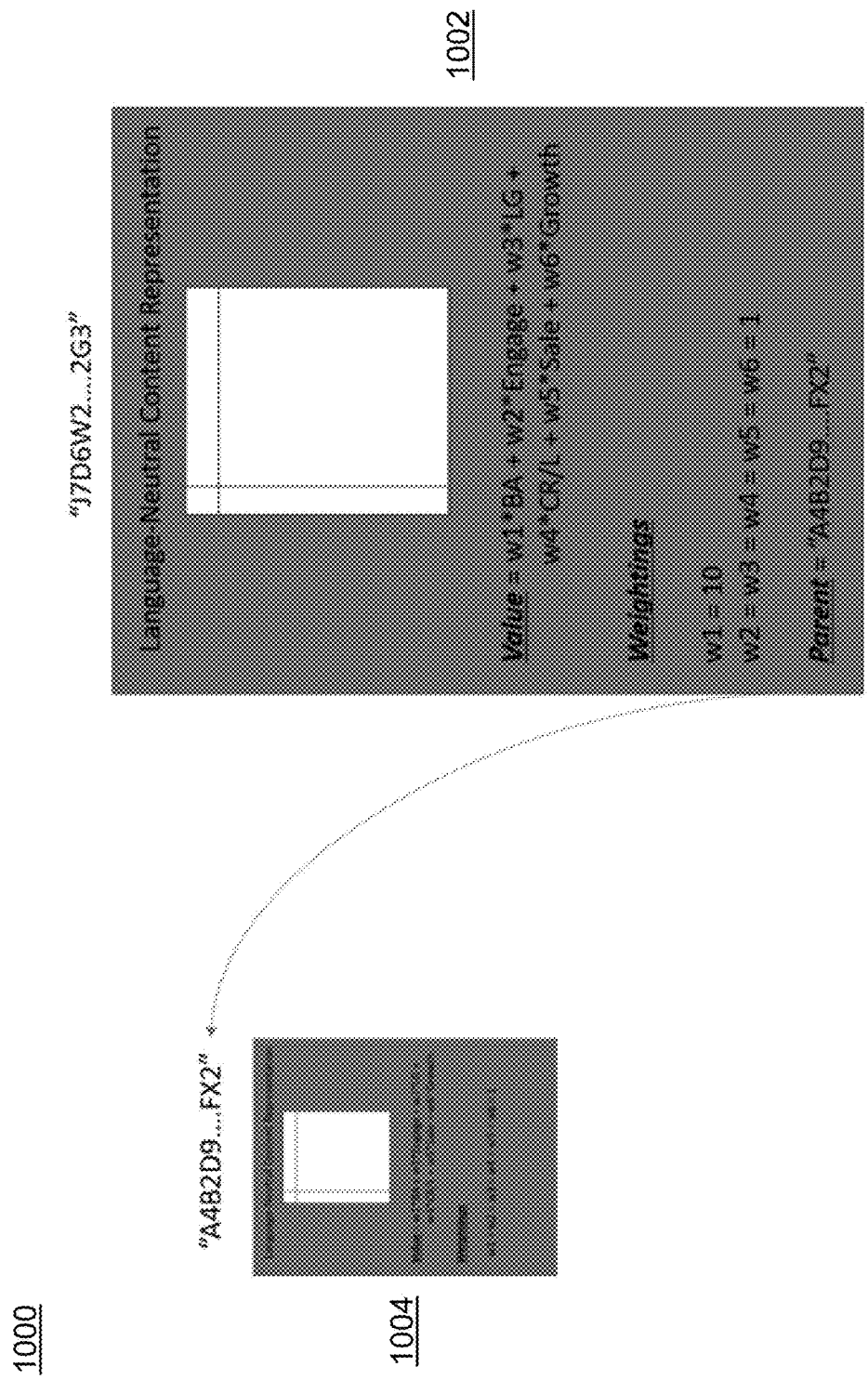
FIG. 10 illustrates parent chaining for altered local content according to an illustrative embodiment.

In these situations, the new (child) object contains a back pointer to the parent content. FIG. 10 illustrates an example 1000 of this chaining concept wherein new object 1002 (child content) points back to original object 1004 (parent content).

A compute node of a local geography that uses altered (child) content records their valuation score by creating a valuation transaction that references the new content ("J7D6W2 . . . 2G3" in FIG. 10).

Ledger owners (via their respective compute nodes) that notice the new content address follow the chain back to any parent content and compare previous valuations with the new valuation results. This can result in successful content modifications to influence the business to apply content changes more broadly across the business.

Given the illustrative description of techniques described herein, FIG. 11 illustrates a data valuation methodology 1100 using language-neutral content addressing.

Step 1102 obtains original content in an original language.

Step 1104 generates a language-neutral representation of the original content.

Step 1106 generates an object comprising the language-neutral representation of the original content and at least one valuation algorithm, wherein the at least one valuation algorithm is configured to perform content valuation.

Step 1108 generates a cryptographic hash value of the object.

Step 1110 stores the object for access using the cryptographic hash value.

In one or more embodiments, the method translates the language-neutral representation of the original content into translated content in a translated language, and links the translated content to the object using the cryptographic hash value of the object.

In one or more embodiments, content valuation is performed on the translated content using the at least one valuation algorithm in the object.

In one or more embodiments, a transaction is generated representing execution of the content valuation on the translated content and stored on a distributed ledger.

In one or more embodiments, the method further comprises: modifying the translated content; generating an object comprising the modified translated content; generating a cryptographic hash value of the object of the modified translated content; and linking the object of the modified translated content to the object comprising the language-neutral representation of the original content.

In one or more embodiments, content valuation is performed on the modified translated content using the at least one valuation algorithm.

In one or more embodiments, a transaction is generated representing execution of the content valuation on the modified translated content and stored on a distributed ledger.

In one or more embodiments, the at least one valuation algorithm comprises one or more value indicators attributable to the original content, and the one or more value indicators are respectively weighted by one or more weights. The one or more weights are originally set for the original content and modifiable for the translated content.

At least portions of the techniques for data valuation using language-neutral content addressing explained above in the context of FIGS. 1-11 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules, steps, nodes or other components shown in FIGS. 1-11 may each run on a computer, server, storage device or other processing platform element. A given such element may be viewed as an example of what is more generally referred to herein as a "processing device." An example of such a processing platform is processing platform 1200 shown in FIG. 12.

The processing platform 1200 in this embodiment comprises a plurality of processing devices, denoted 1202-1, 1202-2, 1202-3, ..., 1202-N, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 of the example embodiment of FIG. 12 is network interface circuitry 1214, which is used to interface the processing device with the network 1204 and other system components and may comprise conventional transceivers.

The other processing devices 1202 of the processing platform 1200 are assumed to be configured in a manner similar to that shown for processing device 1202-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible. Such components can communicate with other elements of the system over any type of network or other communication media.

As indicated previously, in some embodiments, components as disclosed herein can be implemented at least in part in the form of one or more software programs stored in memory and executed by a processor of a processing device. For example, at least portions of a data valuation system using language-neutral content addressing or other components are illustratively implemented in one or more embodiments in the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
obtaining original content in an original language;
generating a language-neutral representation of the original content;
generating a first object comprising the language-neutral representation of the original content and at least one valuation algorithm, wherein the at least one valuation algorithm is configured to perform content valuation;

generating a cryptographic hash value of the first object;
translating the language-neutral representation of the original content into translated content in a translated language;
modifying the translated content;
generating a second object comprising the modified translated content;
generating a cryptographic hash value of the second object of the modified translated content;
linking the second object to the first object; and
storing the first object and the second object for access using the respective cryptographic hash values;
wherein the steps are performed by at least one processing device comprising a processor and a memory, the at least one processing device being operatively connected to a geographically-distributed processing platform.

2. The method of claim 1, further comprising:
linking the translated content to the first object using the cryptographic hash value of the first object.

3. The method of claim 2, further comprising performing content valuation on the translated content using the at least one valuation algorithm in the first object.

4. The method of claim 3, further comprising generating a transaction representing execution of the content valuation on the translated content.

5. The method of claim 4, further comprising storing the transaction on a distributed ledger.

6. The method of claim 1, further comprising performing content valuation on the modified translated content using the at least one valuation algorithm.

7. The method of claim 6, further comprising generating a transaction representing execution of the content valuation on the modified translated content.

8. The method of claim 7, further comprising storing the transaction on a distributed ledger.

9. The method of claim 1, wherein the at least one valuation algorithm comprises one or more value indicators attributable to the original content.

10. The method of claim 9, wherein the one or more value indicators are respectively weighted by one or more weights.

11. The method of claim 10, wherein the one or more weights are originally set for the original content and modifiable for the translated content.

12. The method of claim 1, wherein storing the first object and the second object comprises storing the first object and the second object in an Interplanetary File System utilizing a distributed hash table with a block exchange and namespace methodology that operates across disparate devices and unreliable networks.

13. An article of manufacture comprising a non-transitory processor-readable storage medium having stored therein program code of one or more software programs, wherein the program code, when executed by one or more processing devices operatively connected to a geographically-distributed processing platform, causes the one or more processing devices to perform steps of:
obtaining original content in an original language;
generating a language-neutral representation of the original content;
generating a first object comprising the language-neutral representation of the original content and at least one valuation algorithm, wherein the at least one valuation algorithm is configured to perform content valuation;
generating a cryptographic hash value of the first object;
translating the language-neutral representation of the original content into translated content in a translated language;
modifying the translated content;
generating a second object comprising the modified translated content;
generating a cryptographic hash value of the second object of the modified translated content;
linking the second object to the first object; and
storing the first object and the second object for access using the respective cryptographic hash values.

14. The article of claim 13, wherein the steps performed by the one or more processing devices further comprise:
linking the translated content to the first object using the cryptographic hash value of the first object.

15. The article of claim 14, wherein the steps performed by the one or more processing devices further comprise:
performing content valuation on the translated content using the at least one valuation algorithm in the first object;
generating a transaction representing execution of the content valuation on the translated content; and
storing the transaction on a distributed ledger.

16. The article of claim 13, wherein storing the first object and the second object comprises storing the first object and the second object in an Interplanetary File System utilizing a distributed hash table with a block exchange and namespace methodology that operates across disparate devices and unreliable networks.

17. A system comprising one or more processing devices operatively connected to a geographically-distributed processing platform, the one or more processing devices configured to:
obtain original content in an original language;
generate a language-neutral representation of the original content;
generate a first object comprising the language-neutral representation of the original content and at least one valuation algorithm, wherein the at least one valuation algorithm is configured to perform content valuation;
generate a cryptographic hash value of the first object;
translate the language-neutral representation of the original content into translated content in a translated language;
modify the translated content;
generate a second object comprising the modified translated content;
generate a cryptographic hash value of the second object of the modified translated content;
link the second object to the first object; and
store the first object and the second object for access using the respective cryptographic hash values.

18. The system of claim 17, wherein the one or more processing devices are further configured to:
link the translated content to the first object using the cryptographic hash value of the first object.

19. The system of claim 18, wherein the one or more processing devices are further configured to:
perform content valuation on the translated content using the at least one valuation algorithm in the first object;
generate a transaction representing execution of the content valuation on the translated content; and
store the transaction on a distributed ledger.

20. The system of claim 17, wherein storing the first object and the second object comprises storing the first object and the second object in an Interplanetary File System utilizing a distributed hash table with a block exchange and namespace methodology that operates across disparate devices and unreliable networks.

\* \* \* \* \*